April 17, 1945.   R. C. TURNER   2,373,927
CENTERING ATTACHMENT
Filed Oct. 27, 1943
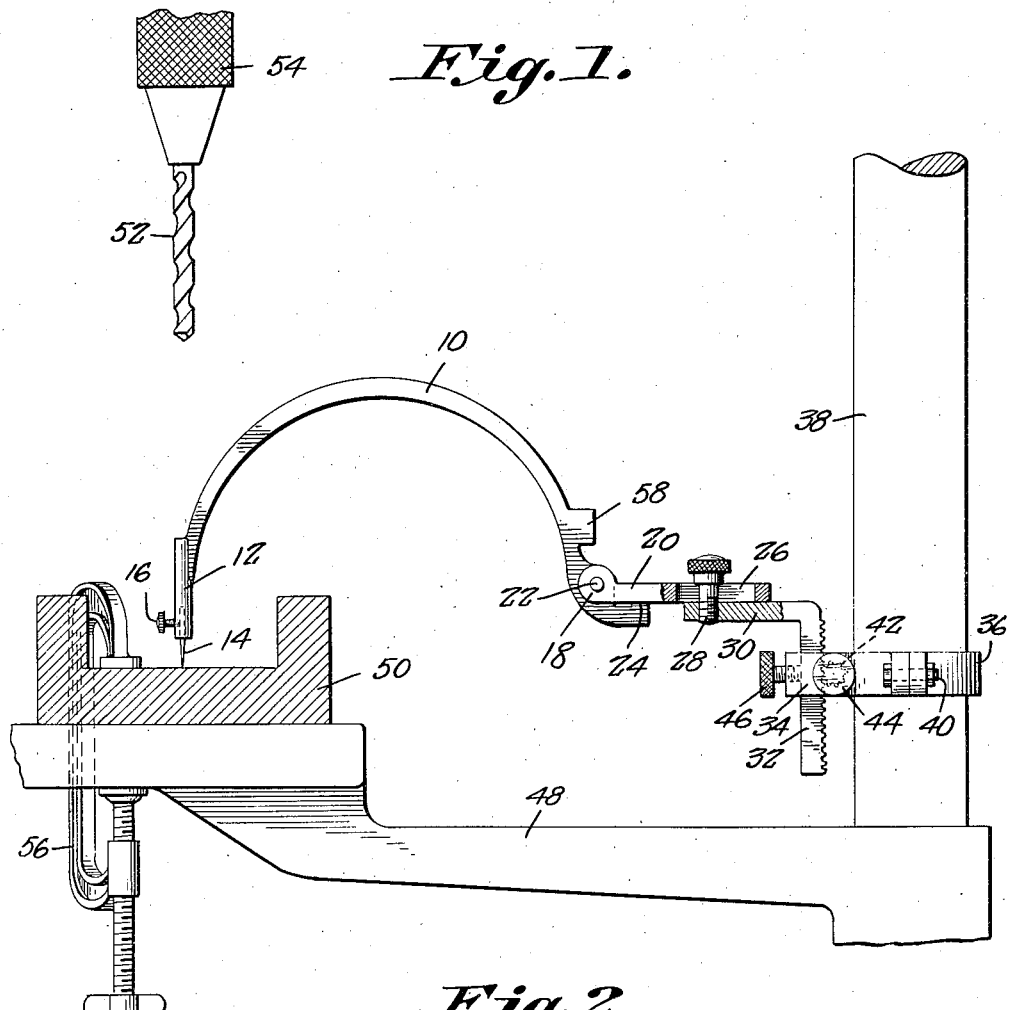
Fig. 1.
Fig. 2.
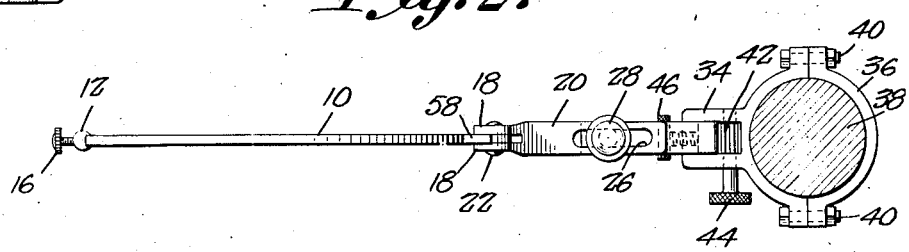
Raymond C. Turner,
INVENTOR.
BY
Victor J. Evans & Co.
ATTORNEYS Patented Apr. 17, 1945

2,373,927

UNITED STATES PATENT OFFICE 2,373,927

CENTERING ATTACHMENT

Raymond C. Turner, Columbus, Ohio

Application October 27, 1943, Serial No. 507,845

4 Claims. (Cl. 77—55)

My invention relates to drill presses, and has among its objects and advantages the provision of an improved centering attachment.

In the accompanying drawing:

Figure 1 is a fragmentary elevational view of a drill press illustrating my invention applied thereto, and Figure 2 is a top view.

In the embodiment of the invention selected for illustration, I make use of a bowed arm 10 having a head 12 provided with a socket or bore for the reception of a marking needle 14. This needle may be fixedly secured to the head by a set screw 16. The opposite end of the arm 10 lies between ears 18 on an extension arm 20 and is pivotally connected therewith, as at 22. A stop 24 is formed on the arm 10 to engage underneath the extension arm 20 and restrain the arm 10 from downward pivotal movement beyond a predetermined position.

The extension arm 20 is provided with a slot 26 for the reception of a screw 28 threaded into a supporting arm 30. The supporting arm is in the nature of an L having a vertical rack 32 slidably guided in a U-shaped extension 34 on one section of a split clamp 36 which may be fixedly related to the drill press column 38 through tightening of the bolts 40. A gear 42 is rotatably journaled in the extension 34 and meshes with the rack 32, this gear being provided with a stem 44 through the medium of which the gear may be rotated for imparting longitudinal movement to the rack 32 when making vertical adjustments of the arm 10. A set screw 46 is threaded through the bight of the extension 34 for end engagement with the rack 32 to secure the latter against accidental movement.

Figure 1 illustrates the column 38 as extending upwardly from the drill press table 48 for supporting work 50 underneath the drill 52 carried by the drill spindle 54. This construction is old and well known in the art.

In using the centering attachment, a drill is inserted in the spindle 54 and the work 50 is then adjusted so that the drill will contact the work at the exact point desired. The work is then secured to the table by a clamp 56. The arm 10 is then swung into the position of Figure 1 and is adjusted for length so as to bring its needle 14 into registration with the mark placed on the work by the drill. Thus the arm 10 will be adjusted so that the needle 14 will always contact the work coaxially of the drill axis. This eliminates the necessity of employing the drill press point for centering work. The drill will always bore coaxially of the mark placed on the work by the needle 14. This attachment eliminates the necessity of centering punching work. The arm 10 may be pivoted upwardly and brought to rest on the arm 20 through engagement between the latter and a stop 58 on the arm. The arm 10 is easily adjusted vertically through the medium of the rack 32 and its meshing gear 42.

Without further elaboration, the foregoing will so fully explain my invention, that others may, by applying current knowledge, readily adapt the same for use under various conditions of service.

I claim:

1. In a drill press having a drill mount, a column and a work supporting table, the combination of a clamp attached to said column and provided with a rotatable gear, a rack meshing with said gear and slidably guided in said clamp for movement longitudinally of said column, said rack having a supporting arm, an adjusting arm slidably mounted on said supporting arm, a screw for clamping the adjusting arm to said supporting arm, an upwardly bowed arm pivotally connected with said adjusting arm for rotation about an axis at right angles to the axis of said column, and a pointed marker carried by the free end of said bowed arm and arranged to engage work coaxially with the axis of said drill mount.

2. A centering attachment for a drill press having a column and a work support, comprising an arm, means adapted to secure the arm to the column for adjustment vertically with relation to the work support, and a second arm carrying a marker and pivoted to said first arm for movement into upright position thereon or into a horizontal position thereon with the marker in contact with the work.

3. A centering attachment for a drill press having a column and a work support, comprising an arm, means adapted to secure the arm to the column for vertical adjustment with relation to the work support, a second arm mounted on said first arm for adjustment in the direction of or away from the work support, and a third arm carrying a marker and pivoted to said second arm for movement into an upright position thereon or into a position extending horizontally therefrom with the marker in contact with the work.

4. A centering attachment for a drill press having a column and a work support, comprising an arm, means adapted to secure the arm to the column for vertical adjustment with relation to the work support, a second arm mounted on said first arm for adjustment in the direction of or away from the work support, a third arm carrying a marker and pivoted to said second arm for movement into upright position thereon or into a horizontally extending position therefrom with the marker in contact with the work, and means carried by the third arm for contact with the second arm to maintain the third arm in either of its positions.

RAYMOND C. TURNER.